UNITED STATES PATENT OFFICE

HENRY A. GARDNER, OF WASHINGTON, DISTRICT OF COLUMBIA

DELUSTERING

No Drawing.  Application filed July 1, 1929. Serial No. 375,346.

This invention relates to delustering; and it comprises a process of producing opalescence, or a "flat" finish, as the case may be, in fibers, films, varnishes, lacquers, etc., wherein an organosol of a metallic oxid, advantageously $TiO_2$ or $ZrO_2$, is produced in an organic liquid by hydrolysis of an alkylated compound of such metal therein and such organosol is used in or added to compositions for forming filaments or films; all as more fully hereinafter set forth and as claimed.

Most of the materials, the gums, resins, cellulose esters and ethers, etc., used in making films, filaments and varnishes, when dissolved in solvents tend to give transparent and lustrous solutions and the final products are more or less lustrous. Frequently however a silky opalescence to transmitted light or a "flat finish" by reflected light is deemed more desirable. Opacity and, to some extent, flatness can be and are attained by the use of the ordinary fine fillers mixed with the composition, such as barium sulfate or titanium dioxid; but these materials as commercially obtainable are too coarse grained to get the best results from an optical point of view.

It is the object of the present invention to provide a new method of obtaining opalescence or flatness, as the case may be, giving superior results. To this end, I utilize the optical properties of organosols of metallic oxids; producing an extremely fine dispersion of various metallic oxids in solvents employed for making films and filaments by adding to the solvent, an alkylated compound of the metal and permitting hydrolysis therein. The alkylated materials best adapted for my purposes in giving translucence are those derived from $TiO_2$ and $ZrO_2$, although a multiplicity of other metallic oxids can be used, some of these being hereinafter indicated. While it is ordinarily assumed that neither titanium or zirconium gives alkylate derivatives, I have found that these can be easily made by processes described post. These alkylate derivatives dissolved in organic liquids are sensitive to moisture and can be readily hydrolyzed to give organosols.

The alkylated compounds of metals which are useful in the present invention are of the alcoholate type. They may be represented by the formula

$$M-O-R$$

wherein M represents a metal and R represents an alkyl group. Of course the number of alcoholic residues required to satisfy the valence of the metal are present. When hydrolyzed, these alcoholated compounds of metal, or metal alcoholates, yield metallic oxids or hydrated oxids which generally are insoluble in organic solvents, particularly those organic solvents commonly used with cellulose esters and ethers in compounding compositions for the manufacture of artificial silks and the like. In forming the organosols required in the present invention it is essential that the metallic oxid or hydrated oxid produced by hydrolysis be substantially insoluble in the particular organic liquid used.

Speaking more specifically of titanium compounds, titanium tetrachlorid can be converted into titanium tetraethylate by the action of metallic sodium and ethyl alcohol, sodium ethylate being probably first formed. The sodium chlorid produced is insoluble and can be readily separated from the liquid products of reaction. The new compound produced, titanium tetraethylate, when freed from any excess of alcohol, is a thin, mobile liquid with a boiling point of 200° C. at 156 mm. It can be vacuum distilled to recover it; or it can be left in the alcoholic solution in which it is made. It is soluble in the usual organic solvents, but is readily decomposed by even traces of moisture; giving an extremely fine dispersion or organosol of $TiO_2$; probably in hydrated form, or as the so-called titanic acid. Zirconium tetraethylate may be made by a similar method and has similar properties. Zirconium tetraethylate may also be distilled under vacuum. Lower boiling but similar compounds may be made by using methyl alcohol in lieu of ethyl alcohol; and still higher boiling compounds by the use of the higher alcohols, propl, butyl, pentyl, etc. These alkylated titanium and zirconium compounds are soluble in a variety of organic liquids, including alcohol, light petroleum distillates and toluol.

Solutions of any of these alkylated compounds in absolute alcohol, hydrocarbons, etc., are clear, but on addition of even traces of water, hydrolysis at once occurs. According to the quantity of alkylated derivatives present, the result may vary from a simple opalescence to the formation of a stiff gel or jelly. Because of the extremely fine particle size in these dispersions, all the sols and gels produced are translucent rather than opaque. For example, by adding 1 cc. of titanium tetraethylate to 10 cc. of a mixture of 95 per cent alcohol and ether, a dense, stiff jelly is formed by the water present in the alcohol. The jelly is however quite translucent, indicating an extreme fineness of subdivision in the $TiO_2$ formed.

The present invention may be utilized in many directions. In making varnishes and lacquers opalescent to transmitted light and flat to reflected light, a small amount of titanium tetraethylate or one of the other alkylated compounds mentioned may be added to one of the solvents used in making the varnish or lacquer. In making automobile lacquers, for example, opalescent or flat, an ordinary lacquer is mixed with a little titanium tetraethylate, dissolved in alcohol or toluol. Ordinarily, there is enough moisture present in the lacquer to produce the desired organosol. The present invention is even of advantage where the lacquer carries incorporated pigment in amount sufficient to make it opaque, since it destroys the luster of the surface layers of the dry lacquer and gives a flat effect. Similarly, titanium tetraethylate, or one of the other compounds mentioned, may be dissolved in an anhydrous solvent and added to the compositions used in making celluloid articles, nitrocellulose threads (Chardonnet silk), acetylcellulose threads, etc.

I regard the present invention as particularly useful with artificial silk made from either nitrocellulose or acetylcellulose, since it enables the production of a silky opalescence, obviating the high luster of the ordinary threads. An additional advantage is the greater ease of dyeing of the delustered threads, since titanium hydroxid and zirconium hydroxid are excellent mordants; their presence enabling the use of a wide variety of dyes not otherwise applicable to these artificial silks.

The color of the dispersed particles of $TiO_2$ or $ZrO_2$ is white and they give a pearly or silky opalescence; but the particles may be dyed any color, giving a correspondingly tinted opalescence. This may be done by dissolving a basic dye in the alkylate solution. On hydrolysis, the hydroxid particles take up or adsorb the dye.

In a specific embodiment of the present invention, employing titanium tetraethylate to make delustered silk with a silky opalescence, 1 part by volume of liquid titanium tetraethylate was dissolved in 10 parts of absolute alcohol. The solution was mixed with 100 parts of a mixture of ethyl ether and alcohol in the proportion of 60:40, the alcohol being ordinary 95 per cent. A white but translucent jelly formed. Nitrocellulose in the proportion of 25 per cent by weight was added and the mixture stirred until a good solution was obtained. The translucent preparation obtained was forced through capillaries to form threads in the usual method adopted to form artificial silk; the fiber being subsequently denitrated and otherwise processed as usual. The final delustered silk had a translucent, dull appearance like that of natural silk. While I added the titanium tetraethylate to the alcohol-ether before dissolving the nitrocellulose, the nitrocellulose can be as well first dissolved and then the tetraethylate added.

Cellulose acetate silk of dull translucent appearance may be formed in a similar manner. In one particular case, I dissolved about 20 per cent of cellulose acetate in acetone and added up to 10 per cent of an absolute alcohol solution of zirconium tetraethylate. This gave a highly colloidal dispersion of $ZrO_2$ or its hydrate. The translucent solution was used, as before, for making fibers by extrusion.

Cellulose acetate silk and nitrocellulose silk formed in the manner just described both have the silky translucency of natural silk and the general appearance of natural silk. Unique silks may be made by adding a small proportion of a basic dye to the solution of titanium or zirconium tetraethylate. On hydrolysis, the very finely dispersed particles of hydroxid are tinted and the resulting silk has a peculiar tinted opalescence. By the use of a very small amount of a blue dye, a brilliant white opalescence is obtained, this amount of blue dye serving to compensate for the natural yellow of the fiber.

While I have spoken more specifically of titanium and zirconium compounds and while I regard them best adapted for my purposes, a wide variety of other metals forming alkyl derivaties hydrolyzed by water may be used in their lieu. Aluminum, magnesium and zinc compounds may be mentioned. For special purposes, metals having colored oxids, such as cobalt and nickel, may be used. While cobalt and nickel are not presumed to form direct connected alkyl derivatives, their chlorids, bromids and iodids in alcoholic solution will give dialkylated derivatives on treatment with sodium.

Linseed oil treated according to the present invention, by converting it into an organosol of cobalt, manganese, vanadium or lead oxid, is not only converted into a form drying with a flat finish but also one which dries quickly; the finely dispersed particles of the hydrated oxids of these metals produced in the present manner being unusually active as catalysts in promoting drying.

What I claim is:—

1. In the production of artificial silk having an opalescent silky translucence from an artificial silk composition, comprising a cellulose material of the class consisting of cellulose esters and ethers, and an organic liquid component, the steps which comprise adding a hydrolyzable alkylated compound of metal to an organic liquid component of said artificial silk composition in the presence of moisture and thereafter forming filaments of artificial silk from said artificial silk composition containing said liquid organic component.

2. In the production of artificial silk having an opalescent silky translucence by the process of claim 1 in which a hydrolyzable alkylated compound of zirconium is used.

3. In the production of artificial silk having an opalescent silky translucence by extrusion of a cellulosic solution, the process which comprises developing by hydrolysis of an alkylated compound of a metal, a metallic oxid dispersion, in situ, within said cellulosic solution prior to the extrusion thereof.

4. In the production of artificial silk having an opalescent silky translucence by extrusion of a cellulosic solution, the process which comprises developing a metallic oxid dispersion within said cellulosic solution, dyeing the said metallic oxid dispersion and extruding the resulting product.

5. In the manufacture of delustered materials from cellulose materials of the class consisting of cellulose esters and ethers, the process which comprises admixing a liquid alkylate of a metal with a liquid capable of dissolving said material and containing sufficient water to hydrolyze said metallic alkylate, dissolving said material in the mixture thus obtained and extruding said mixture.

6. In the manufacture of delustered materials from nitrocellulose, the process which comprises mixing a liquid ethylate of a metal with a liquid capable of dissolving nitrocellulose and containing sufficient water to hydrolyze said ethylate, dissolving nitrocellulose in the mixture thus obtained and extruding the mixture.

7. The process of claim 6 in which the said alkylate is titanium ethylate.

8. The process of claim 6 in which the said alkylate is zirconium tetraethylate.

9. In the manufacture of delustered materials from nitrocellulose, the process which comprises dissolving an alkylate of a metal in absolute alcohol, mixing the solution thus obtained with a mixture of ethyl ether and alcohol containing sufficient water to hydrolyze said ethylate, thus hydrolyzing said ethylate and producing a colloidal dispersion, dissolving nitrocellulose in the mixture thus obtained and extruding said mixture.

10. In the manufacture of delustered materials from cellulose acetate, the process which comprises dissolving cellulose acetate in acetone, adding to the solution thus obtained a solution of an alkylate of a metal dissolved in absolute alcohol, hydrolyzing the said alkylate in situ, and extruding the mixture thus obtained.

11. The process of claim 10 in which the said alkylate is zirconium tetraethylate.

12. In the manufacture of delustered materials from cellulose acetate, the process which comprises dissolving cellulose acetate in a suitable solvent, adding to the solution thus obtained a solution of an alkylate of a metal, hydrolyzing said alkylate in solution and extruding the mixture thus obtained.

13. In the manufacture of delustered materials from cellulose ethers and esters, the process which comprises dissolving such substances in a suitable solvent, said solvent containing sufficient water to hydrolyze an alkylate of a metal, adding to the solution thus obtained an alkylate of a metal, hydrolyzing the said alkylate in situ and extruding the mixture thus obtained.

14. In the manufacture of delustered, colored materials from cellulose esters and ethers, the process which comprises dissolving such substances in a suitable solvent, admixing the solution thus obtained with a solution comprising an alkylate of a metal, a dye and a solvent in which the said alkylate is soluble, hydrolyzing the alkylate and dyeing the colloidal particles of the metallic hydroxide and oxide thus produced with the said dye and extruding the colored mixture thus obtained to produce said delustered colored materials.

15. In the manufacture of delustered, colored materials from cellulose esters and ethers, the process which comprises dissolving an alkylate of a metal in a suitable solvent, adding a dye to the solution thus obtained, hydrolyzing the alkylate in situ thus producing a colloidal dispersion of metallic hydroxid or oxid and dyeing the colloidal particles thus produced, mixing the colloidal dispersion thus obtained with a cellulose ester or ether, and extruding the colored mixture thus obtained to produce said delustered colored materials.

16. The production of delustered artificial silk by the method of claim 1, wherein said hydrolyzable alkylated compound of metal is added to the said organic liquid component prior to mixing with the said cellulose material.

17. The production of delustered artificial silk by the method of claim 1, wherein said hydrolyzable alkylated compound of metal is added to a mixture of said cellulose material and said organic liquid component.

In testimony whereof, I have hereunto affixed my signature.

HENRY A. GARDNER.